United States Patent
Mandelli et al.

(10) Patent No.: US 9,973,678 B2
(45) Date of Patent: May 15, 2018

(54) PHASE-DETECT AUTOFOCUS

(71) Applicant: InVisage Technologies, Inc., Menlo Park, CA (US)

(72) Inventors: Emanuele Mandelli, Mountain View, CA (US); Gregory Chow, Mountain View, CA (US); Naveen Kolli, Fremont, CA (US)

(73) Assignee: INVISAGE TECHNOLOGIES, INC., Newark, CA (US)

( * ) Notice: Subject to any disclaimer, the term of this patent is extended or adjusted under 35 U.S.C. 154(b) by 0 days. days.

(21) Appl. No.: 14/995,784

(22) Filed: Jan. 14, 2016

(65) Prior Publication Data

US 2016/0205311 A1   Jul. 14, 2016

Related U.S. Application Data

(60) Provisional application No. 62/103,235, filed on Jan. 14, 2015.

(51) Int. Cl.
| | |
|---|---|
| *H04N 5/232* | (2006.01) |
| *H04N 9/04* | (2006.01) |
| *G02B 5/20* | (2006.01) |
| *H04N 5/369* | (2011.01) |
| *G02B 7/34* | (2006.01) |

(52) U.S. Cl.
CPC ......... *H04N 5/23212* (2013.01); *G02B 5/201* (2013.01); *G02B 7/346* (2013.01); *H04N 5/3696* (2013.01); *H04N 9/045* (2013.01)

(58) Field of Classification Search
None
See application file for complete search history.

(56) References Cited

U.S. PATENT DOCUMENTS

| | | |
|---|---|---|
| 8,212,917 B2 | 7/2012 | Amano |
| 8,363,153 B2 | 1/2013 | Tsukada |
| 8,558,940 B2 | 10/2013 | Kusaka et al. |
| (Continued) | | |

FOREIGN PATENT DOCUMENTS

WO   2015029425 A1   3/2015

OTHER PUBLICATIONS

"International Application U.S. Appl. No. PCT/US2016/013397, International Search Report dated Mar. 16, 2016", 2 pgs.

(Continued)

*Primary Examiner* — Stephen Coleman
(74) *Attorney, Agent, or Firm* — D. Kligler IP Services Ltd.

(57) ABSTRACT

In various embodiments, methods, techniques, and related apparatuses for phase-detect autofocus devices are disclosed. In one embodiment, a phase-detect system includes a first color filter formed over a first pixel and a second pixel formed adjacent to the first pixel with a second color filter being formed over the second pixel. The second color filter has a color different from a color of the first color filter. A micro-lens spans the first pixel and the second pixel, configured to capture a phase difference in spatial frequency information present in an imaged scene. The first pixel and the second pixel are placed adjacent to each other in at least one of a horizontal direction, a vertical direction, and/or a diagonal direction, with an arrangement of the two pixels being replicated at either regular and/or irregular intervals across the sensor. Other methods and apparatuses are disclosed.

20 Claims, 5 Drawing Sheets

(56) References Cited

U.S. PATENT DOCUMENTS

| | | |
|---|---|---|
| 8,730,373 B2 | 5/2014 | Egawa |
| 8,866,954 B2 | 10/2014 | Koshiba |
| 2010/0276736 A1 | 11/2010 | Bocko et al. |
| 2011/0267510 A1 | 11/2011 | Malone et al. |
| 2012/0092545 A1 | 4/2012 | Sugawara |
| 2013/0210188 A1* | 8/2013 | Wang ................. H01L 27/1464 |
| | | 438/73 |
| 2015/0092092 A1* | 4/2015 | Okigawa ............... H04N 9/045 |
| | | 348/280 |
| 2015/0195466 A1 | 7/2015 | Takase et al. |
| 2016/0014353 A1* | 1/2016 | Lee ....................... H04N 5/347 |
| | | 250/208.1 |
| 2016/0284749 A1 | 9/2016 | Kurokawa |
| 2017/0243912 A1 | 8/2017 | Kaneda |

OTHER PUBLICATIONS

"International Application Serial No. PCT/US2016/013397, Written Opinion dated Mar. 16, 2016", 5 pgs.

International Application # PCT/US2017/057282 search report dated Jan. 11, 2018.

International Application # PCT/US2017/057284 search report dated Jan. 25, 2018.

* cited by examiner

PHASE-DETECT AUTOFOCUS

PRIORITY CLAIM

The present application claims the benefit of priority of U.S. Provisional Patent Application Ser. No. 62/103,235, filed Jan. 14, 2015, and entitled "DEVICES, SYSTEMS, AND METHODS FOR PHASE-DETECT AUTOFOCUS," which is incorporated herein by reference in its entirety.

TECHNICAL FIELD

The present application relates generally to the field of optical and electronic systems and methods, and more specifically to devices employing phase-detect autofocus systems.

BACKGROUND

Camera systems require autofocus (AF) in many applications to ensure that relevant portions of scenes, of varying distances from the camera, are acquired as in-focus image planes. As shown in FIG. 1, focus is achieved at an optimum distance of the sensor from the lens. The goal of an autofocus system in a camera is to predict this optimum distance based on image information, and utilize on-board mechanics to achieve the optimum distance.

Image sensors have been developed that enable the acquisition of information with reference to the extent of focus of an image using dual pixel autofocus. Certain implementations of dual pixel AF employ phase-detection, wherein a region the size of a standard pixel in an image sensor array is divided into two sub-pixels. By comparing the outputs of the divided sub-pixels, phase-difference autofocus allows an estimation of whether the image is in focus, and provides information to a feedback system to enable rapid convergence to a focused image.

Dividing certain pixels into sub-pixels can lead to imaging artifacts, such as the creation of a defect pixel in the location in which a split-pixel was employed as shown in FIG. 2.

SUMMARY

The disclosed subject matter describes various means of providing information using an image sensor that is an input to an autofocus system. In embodiments, the disclosed subject matter includes utilizing a first standard-sized pixel as one component of a phase-detect system, and a second standard-sized pixel, adjacent to the first pixel, as a second component of a phase-detect system.

In embodiments, a first color filter covers a first standard-sized pixel, and a second and distinct color filter covers a second standard-sized pixel.

In embodiments, the disclosed subject matter provides defect-less autofocus.

In embodiments, the disclosed subject matter provides low-defect autofocus. For example, the pixels utilized for autofocus provide only a modest modification to response and image quality associated with the means by which they provide autofocus information.

In embodiments, a single two-pixel-wide micro-lens is used to provide local direction of incident light onto a pair of adjacent pixels used in the defect-less autofocus solution described herein.

DETAILED DESCRIPTION

Figure 1:
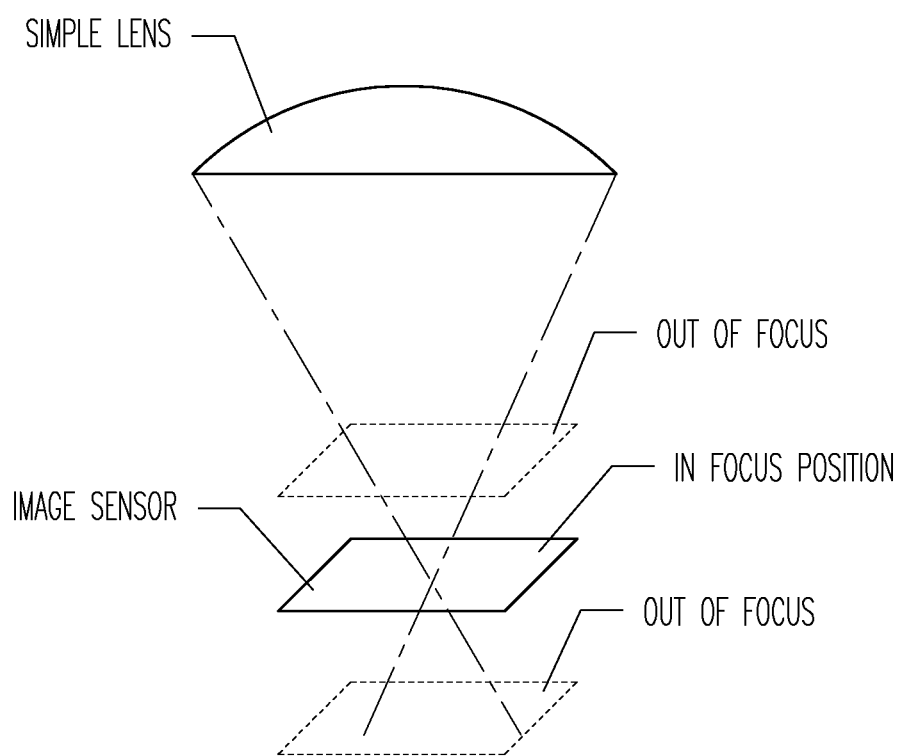
FIG. 1 shows an example of a simple lens with light rays focused on an image sensor (in-focus position) and out-of-focus positions ahead of and behind the position of the image sensor.
Figure 2:
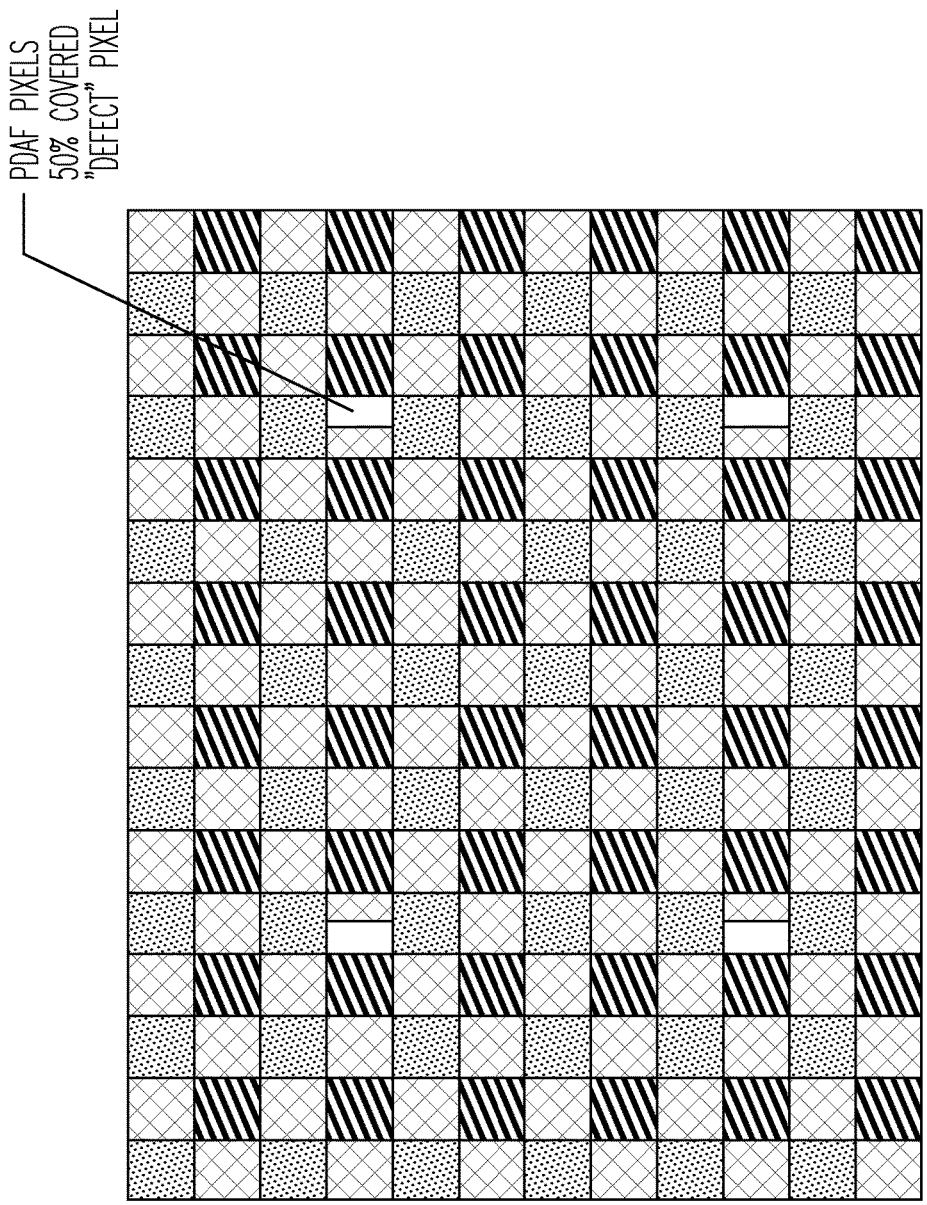
FIG. 2 shows an example of dividing certain pixels into sub-pixels that can lead to imaging artifacts.
Figure 3:
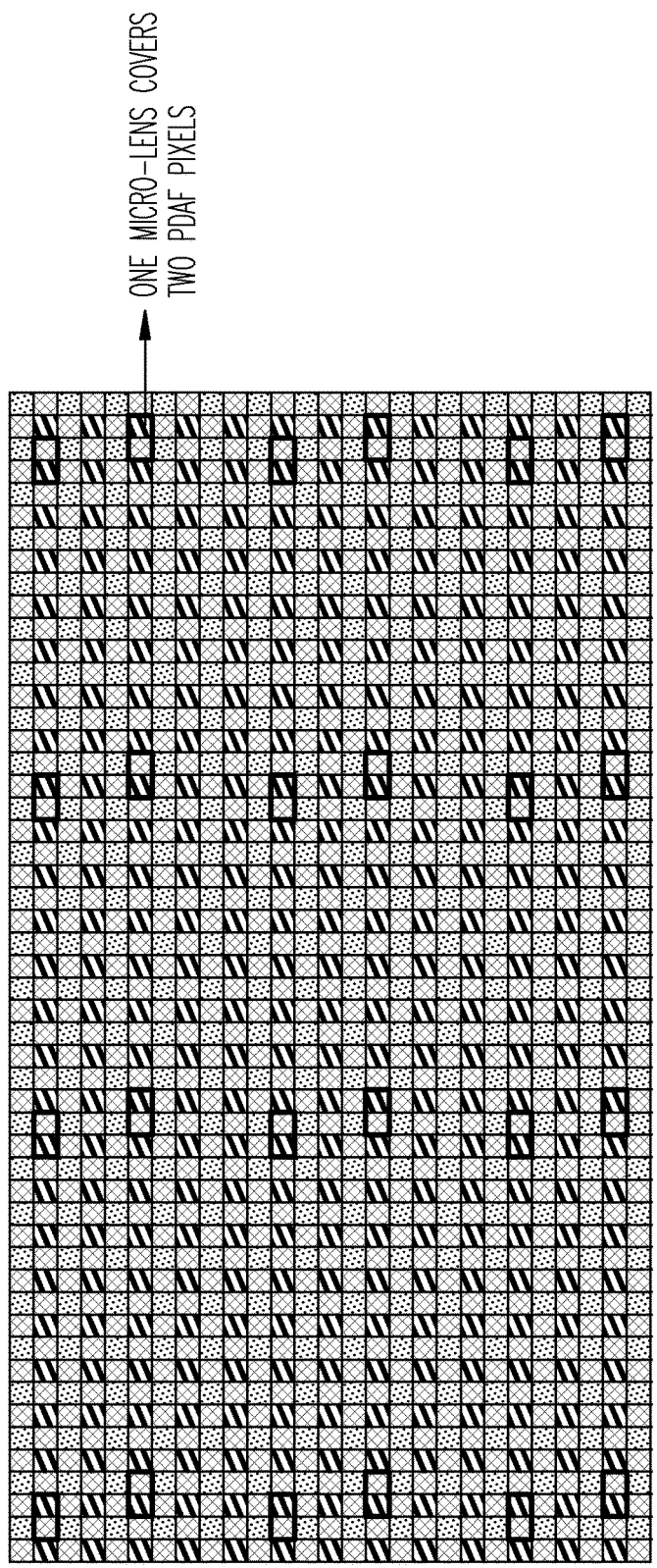
FIG. 3 shows an example of a phase-detect autofocus pixel (PDAF pixel) that comprises two pixel regions, a left pixel region and a right pixel region.

Referring now to FIG. 3, embodiments of the disclosed subject matter include a phase-detect autofocus pixel (PDAF pixel) that comprises two pixel regions, a left pixel region and a right pixel region. In one example, one of the pixel regions may be covered using a red color filter, and the other pixel region may be covered using a green color filter. As seen in FIG. 3, multiple PDAF pixel regions may be included in a given image sensor. Also, the multiple PDAF pixel regions may be arranged in differing orientations (e.g., horizontally, vertically, diagonally, and in combinations thereof). The orientations are discussed in detail, below.

In embodiments, adjacent pixels covered with other color filters, such as blue (B), clear, red (R), green (G), etc., may be used.

In embodiments, certain pixels designated for this PDAF purpose may also be fitted with a color filter of choice, which is different from the regular color filter pattern from the rest of the image sensor array.

In embodiments of this described strategy, these pixels may be corrected, or partially corrected, since their response is modified relative to standard (non-PDAF-enabling) pixels.

A variety of color filter pattern options can be utilized in a similar manner to enable a PDAF on a sensor. In various embodiments, a standard pattern, such as a Bayer pattern, may be used. In embodiments, an RGB (IR) pattern may be employed. In various embodiments, other patterns may be employed.

Figure 4:
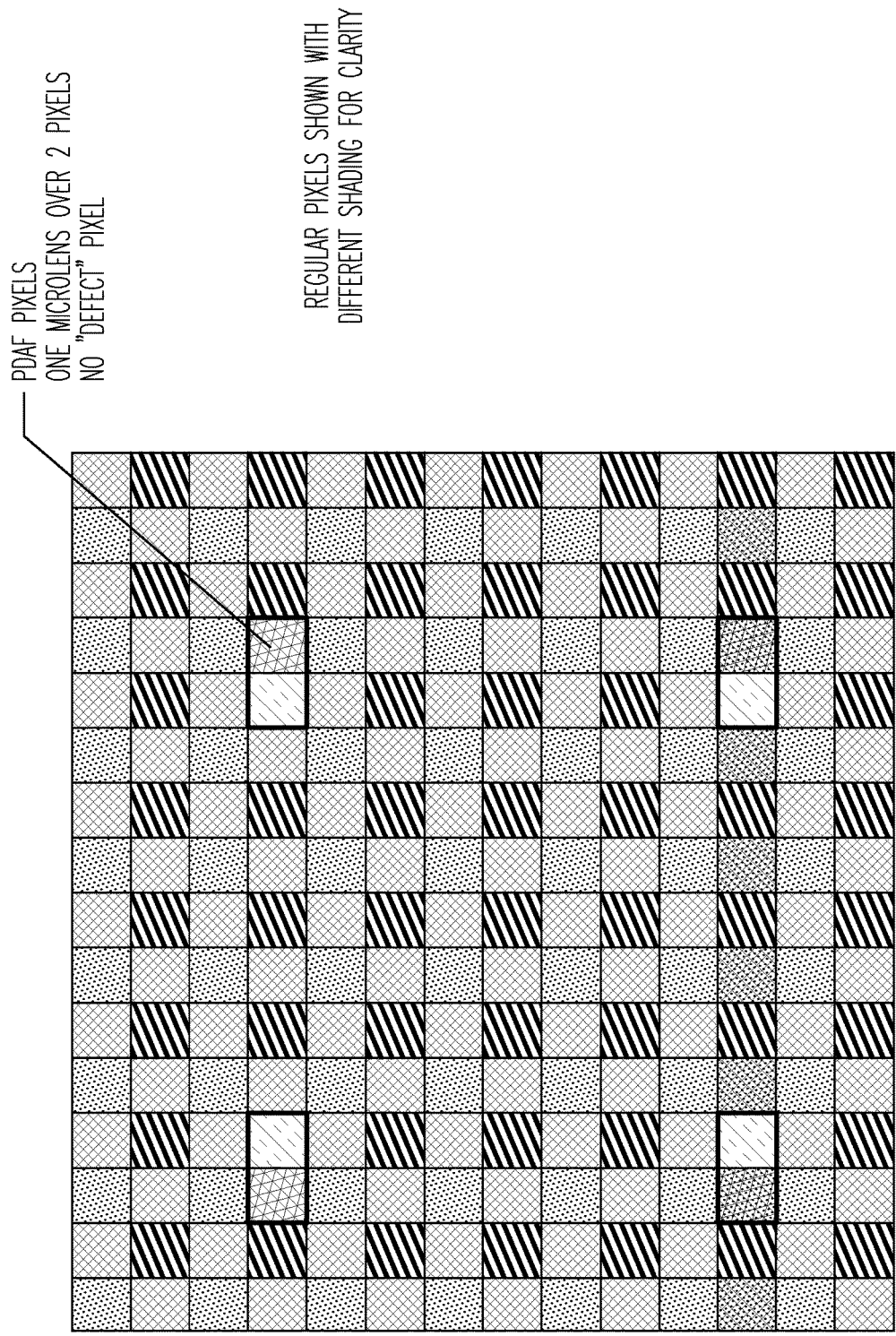
FIG. 4 shows an example of a pair of PDAF pixel regions in a part of an image sensor pixel array.

Referring to FIG. 4, a pair of PDAF pixel regions are shown, in a part of the image sensor pixel array. In this example embodiment, the choice of color filters may be mirror-image-chosen relative to one another. For example, in the left region the pixel-pair includes a green pixel on the left and a red pixel on the right, while in the right region the pixel-pair includes a red pixel on the left and a green pixel on the right. In the image, a microlens spanning the two constituent pixels of the PDAF pixel region is shown.

In various embodiments, a series of two-pixel-wide microlenses may be placed in different locations across the image sensor array. This placement allows for sufficient samples in order to detect a best-focus distance based on a selected area on the image, as is common in "Live-View" mode on, for example, digital single-lens reflex cameras (DSLRs) where the user chooses an area of the image on which to focus. In embodiments, a close proximity can be maintained between a two-pixel-wide micro-lens spanning two colors and its mirror pattern, so that a high correlation can be expected between them.

The placement of the two-pixel-wide micro-lenses should provide sufficient sampling of an image region in the horizontal and vertical dimensions of the array. In various embodiments, it may also be desirable to implement certain irregularities in the sampling, to overcome, for example, aliasing effects introduced by a very regular sampling. Therefore, in some embodiments, an arrangement of the two pixels may be replicated in intervals of regular intervals and/or irregular intervals across the sensor.

Figure 5:
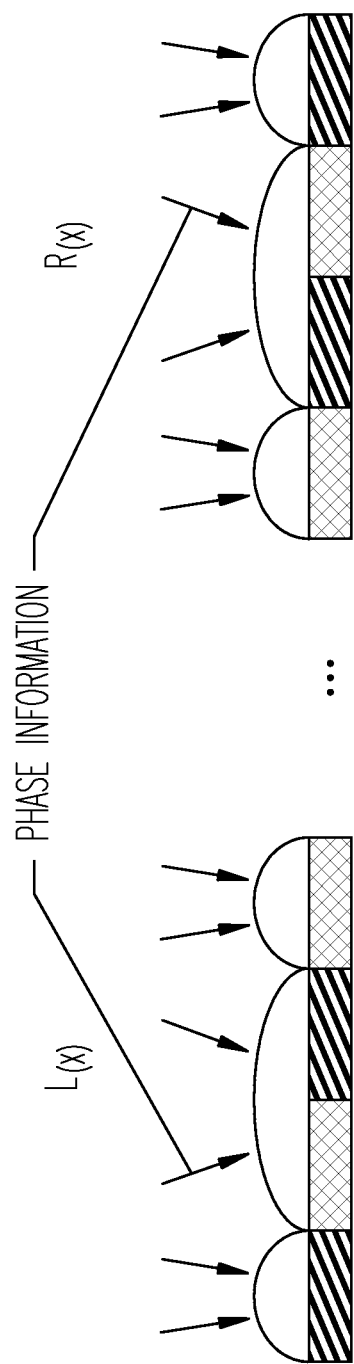
FIG. 5 shows an example of when a given area of the image sensor is chosen for focusing, two sets of sub-images are analyzed by an auto-focus system; one sub-image comprises pixels on one side of the two-pixel-wide micro-lenses and the other sub-image comprises pixels on the other side.

Referring to FIG. 5, when a given area of the image sensor is chosen for focusing, two sets of sub-images are analyzed by the auto-focus system. One sub-image comprises pixels on one side of the two-pixel-wide micro-lenses and the other sub-image comprises pixels on the other side of the micro-lenses.

In the case of an out-of-focus image region, the spatial frequency information from the scene is mapped differently (with a different phase) onto the "left-pixel" sub-image and the "right-pixel" sub-image. This difference is used as a basis for determining the change in lens-to-imager-distance required. In-focus is achieved in the region of interest when the image based on the "left-pixel" sub-image and the "right-pixel" sub-image are at the highest correlation possible (are in phase). This implies that, when in focus, spatial frequency information in the image mapped to the "left-pixel" and "right-pixel" sub-images is synced in phase and amplitude, yielding a maximum correlation.

One advantage of the subject matter disclosed herein, and in the examples shown, is that, for example, the pixels under the red color filter, or the pixels under the green color filter, or both, can be used by an AF system. For example, in imaging conditions favoring red or infrared (IR) light in mobile phone cameras, the AF system could use just the information from the red pixels, and in normal brightly lit conditions, the green pixels could be favored.

In various embodiments, a large number of AF pixels is potentially required in the image array, to allow the user to select a region (or a combination of regions) to focus. It is desirable that these pixels not reduce image information when they are not being used for auto-focus. If these pixels perform in a very different way than the other pixels, they may need to be replaced by a defect pixel correction algorithm which is likely to reduce image information as such replacement is typically prone to uncertainties.

Under the disclosed subject matter, it is expected that the pixels under two-pixel-wide micro-lenses behave, in terms of intensity, in a predictably different way compared to a pixel under a single micro-lens. Thus, correcting the intensity of these pixels for final image output would be a trivial operation on pixel intensity, which can be performed by, for example, an Image Signal Processor (ISP) since the locations of such pixels are known beforehand. In a scenario where this would not be possible, the regularity of the color filters in the array would allow a defect pixel correction algorithm to interpolate the pixel value from neighbor pixels under the same color filter.

In embodiments, a micro-lens spanning two or more pixels horizontally, with each of the pixels covered by any available color filter, may be employed.

In embodiments, a micro-lens spanning two or more pixels diagonally, with each of the pixels covered by any available color filter, may be employed.

In embodiments, a micro-lens spanning two or more pixels vertically, with each of the pixels covered by any available color filter, may be employed.

In embodiments, a micro-lens spanning two or more pixels horizontally may intersect with another micro-lens spanning two or more pixels vertically. Each of the pixels under the micro-lenses may be covered by any available color filter.

In embodiments, the photodetector may employ CMOS silicon (e.g., employing either frontside illumination (FSI) and/or backside illumination (BSI)).

In embodiments, an optically sensitive layer may be employed in light absorption and photodetection. This may include a continuous optically sensitive layer.

In embodiments, a thin and highly absorbing optically sensitive layer may be employed to minimize or reduce optical crosstalk among the pixels making up the PDAF. In embodiments, this may lead to more precise resolving of the extent of focus/out-of-focus.

In embodiments, infrared light may be used as a basis for autofocus. In embodiments, an optically sensitive layer responsive to infrared light may be employed.

In various embodiments, a phase-detect system is disclosed that includes a first pixel as a first component of the phase-detect system with a first color filter formed over the first pixel. A second pixel is formed adjacent to the first pixel, the second pixel being a second component of the phase-detect system. A second color filter is formed over the second pixel where the second color filter has a color different from a color of the first color filter. A micro-lens spans the first pixel and the second pixel with the combination of components being configured to capture a phase difference in spatial frequency information present in an imaged scene. The first pixel and the second pixel are placed adjacent to each other in at least one direction including a horizontal direction, a vertical direction, and/or a diagonal direction. An arrangement of the two pixels is replicated across the sensor in regular intervals and/or irregular intervals across the sensor.

In embodiments, the first color filter of the phase-detect system substantially passes red light and substantially blocks blue light and green light, and the second color filter of the phase-detect system substantially passes green light and substantially blocks blue light and red light.

In embodiments, the first color filter and the second color filter of the phase-detect system employ at least one material that simultaneously blocks certain wavelengths of light and passes certain wavelengths of light.

In embodiments, the first color filter and the second color filter of the phase-detect system are each separately configured to selectively pass at least one wavelength of light chosen from wavelengths of light corresponding to red, green, blue, and infrared light.

In embodiments, the first color filter and the second color filter of the phase-detect system are each separately configured to selectively block at least one wavelength of light chosen from wavelengths of light corresponding to red, green, blue, and infrared light.

In embodiments, the sensor of the phase-detect system incorporates a standard Bayer RGB color filter pattern across the sensor on all pixels, and a plurality of the pixels comprise phase-detect autofocus pixels having specific color filters.

In embodiments, the phase-detect system further includes an optically sensitive layer under the specific color filters for light absorption and photo-detection.

In embodiments, the sensor of the phase-detect system incorporates an RGB-IR color filter pattern across the sensor on all pixels, wherein a plurality of the pixels comprise phase-detect autofocus pixels having specific color filters.

In embodiments, the phase-detect system further includes an optically sensitive layer that is sensitive to visible and infrared light under the specific color filters for light absorption and photo-detection.

In embodiments, when under a first set of light conditions, the phase-detect autofocus pixels under a green color filter array are to be used by an auto-focus system, and, when under a second set of light conditions, the phase-detect autofocus pixels under a second color filter are to be used by the auto-focus system. The second color filter includes one color filter selected from color filters including blue, red, and infrared color filters.

In embodiments, a standard Bayer RGB color filter pattern or an RGB-IR color filter pattern is employed across the sensor on all pixels, with phase-detect autofocus pixels employing specific color filters.

In embodiments, the sensor of the phase-detect system includes a silicon-based CMOS sensor employing frontside illumination (FSI) is to be used for light absorption and photo-detection.

In embodiments, the sensor of the phase-detect system includes a silicon-based CMOS sensor employing backside illumination (BSI) is to be used for light absorption and photo-detection.

In embodiments, only an infrared-passing color filter is employed across the sensor of the phase-detect system on all pixels, including phase-detect autofocus pixels, and an optically sensitive layer that is sensitive to infrared light is employed under the infrared-passing color filter for light absorption and photo-detection.

In various embodiments, an image sensor includes multiple phase-detect autofocus regions, with each of the multiple phase-detect autofocus regions having a first pixel, a first color filter formed over the first pixel and a second pixel, with the second pixel being adjacent to the first pixel. A second color filter is formed over the second pixel, where the second color filter has a color different from a color of the first color filter.

In embodiments, data acquired from the multiple phase-detect autofocus regions are corrected to equalize a signal, in a given color, relative to that acquired for the same incident intensity and color when acquired over non-phase-detect-autofocus-region pixels.

In embodiments, the image sensor includes regions of a Bayer pattern RGGB color filter array layout.

In embodiments, the image sensor includes regions of R, G, B, and IR color filters.

The various illustrations of the methods and apparatuses provided herein are intended to provide a general understanding of the structure of various embodiments and are not intended to provide a complete description of all the elements and features of the apparatuses and methods that might make use of the structures, features, and materials described herein. Also, a person of ordinary skill in the art will understand that various ones of the described embodiments may be combined in various ways or used selectively.

A person of ordinary skill in the art will further appreciate that, for this and other methods and techniques disclosed herein, the activities forming part of various methods and techniques may, in certain cases, be implemented in a differing order, as well as repeated, executed simultaneously, or substituted one for another. Further, the outlined acts, operations, techniques, and structures are only provided as examples, and some of the acts, operations, techniques, and structures may be optional, combined into fewer acts, operations, techniques, and structures, or expanded into additional acts, operations, techniques, and structures without detracting from the essence of the disclosed embodiments. Moreover, as used herein, the term "or" may be construed in either an inclusive or exclusive sense.

The present disclosure is therefore not to be limited in terms of the particular embodiments described in this application, which are intended as illustrations of various aspects. Many modifications and variations can be made, as will be apparent to the person of ordinary skill in the art upon reading and understanding the disclosure provided herein. Functionally equivalent methods and apparatuses within the scope of the disclosure, in addition to those enumerated herein, will be apparent to the person of ordinary skill in the art from reading and understanding the foregoing descriptions. Portions and features of some embodiments may be included in, or substituted for, those of others. Many other embodiments will be apparent to those of ordinary skill in the art upon reading and understanding the description provided herein. Such modifications and variations are intended to fall within a scope of the appended claims. The present disclosure is to be limited only by the terms of the appended claims, along with the full scope of equivalents to which such claims are entitled. It is also to be understood that the terminology used herein is for the purpose of describing particular embodiments only and is not intended to be limiting.

In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A phase-detect system, comprising:
a first pixel as a first component of the phase-detect system;
a first color filter formed over the first pixel;
a second pixel as a second component of the phase-detect system, the second pixel being adjacent to the first pixel;
a second color filter formed over the second pixel, the second color filter having a color different from a color of the first color filter; and
a two-pixel wide micro-lens spanning the first pixel and the second pixel, the two-pixel wide micro-lens configured to capture a phase difference in spatial frequency information present in an imaged scene, the first pixel and the second pixel being placed adjacent to each other in at least one direction selected from directions including a horizontal direction, a vertical direction, and a diagonal direction, an arrangement of the two pixels being replicated in irregular intervals across the sensor.

2. The phase-detect system of claim 1, wherein the first color filter substantially passes red light and substantially blocks blue light and green light, and wherein the second color filter substantially passes green light and substantially blocks blue light and red light.

3. The phase-detect system of claim 1, wherein the first color filter and the second color filter employ at least one material that simultaneously blocks certain wavelengths of light and passes certain wavelengths of light.

4. The phase-detect system of claim 1, wherein the first color filter and the second color filter are each separately configured to selectively pass at least one wavelength of light chosen from wavelengths of light corresponding to red, green, blue, and infrared light.

5. The phase-detect system of claim 1, wherein the first color filter and the second color filter are each separately configured to selectively block at least one wavelength of light chosen from wavelengths of light corresponding to red, green, blue, and infrared light.

6. The phase-detect system of claim 1, wherein, under a first set of light conditions, the phase-detect autofocus pixels under a green color filter array are to be used by an auto-focus system, and wherein, under a second set of light conditions, the phase-detect autofocus pixels under a second color filter are to be used by the auto-focus system, wherein the second color filter includes one color filter selected from color filters including blue, red, and infrared color filters.

7. The phase-detect system of claim 1, wherein only an infrared-passing color filter is employed across the sensor on all pixels, including phase-detect autofocus pixels, and an optically sensitive layer that is sensitive to infrared light is employed under the infrared-passing color filter for light absorption and photo-detection.

8. The phase-detect system of claim 1, wherein the irregular intervals in the arrangement of the two pixels are selected so as to overcome aliasing effects in sampling the spatial frequency information in the imaged scene.

9. The phase-detect system of claim 1, wherein the sensor incorporates a standard Bayer RGB color filter pattern across the sensor on all pixels, and wherein a plurality of the pixels comprises phase-detect autofocus pixels having specific color filters.

10. The phase-detect system of claim 9, further comprising an optically sensitive layer under the specific color filters for light absorption and photo-detection.

11. The phase-detect system of claim 1, wherein the sensor incorporates an RGB-IR color filter pattern across the sensor on all pixels, wherein a plurality of the pixels comprises phase-detect autofocus pixels having specific color filters.

12. The phase-detect system of claim 11, further comprising an optically sensitive layer that is sensitive to visible and infrared light under the specific color filters for light absorption and photo-detection.

13. The phase-detect system of claim 1, wherein a standard Bayer RGB color filter pattern or an RGB-IR color filter pattern is employed across the sensor on all pixels, with phase-detect autofocus pixels employing specific color filters.

14. The phase-detect system of claim 13, wherein the sensor comprises a silicon-based CMOS sensor employing frontside illumination (FSI) is to be used for light absorption and photo-detection.

15. The phase-detect system of claim 13, wherein the sensor comprises a silicon-based CMOS sensor employing backside illumination (BSI) is to be used for light absorption and photo-detection.

16. The phase-detect system of claim 13, wherein, under a first set of light conditions, the phase-detect autofocus pixels under a green color filter array are to be used by the auto-focus system, and wherein, under a second set of light conditions, the phase-detect autofocus pixels under a second color filter are to be used by the auto-focus system, wherein the second color filter includes one color filter selected from color filters including blue, red, and infrared color filters.

17. An image sensor comprising multiple phase-detect autofocus regions replicated in irregular intervals across the sensor, each of the multiple phase-detect autofocus regions comprising:
a first pixel; a first color filter formed over the first pixel;
a second pixel, the second pixel being adjacent to the first pixel;
a second color filter formed over the second pixel, the second color filter having a color different from a color of the first color filter; and
a two-pixel wide micro-lens spanning the first pixel and the second pixel, the two-pixel wide micro-lens configured to capture a phase difference in spatial frequency information present in an imaged scene.

18. The image sensor of claim 17, wherein data acquired from the multiple phase-detect autofocus regions are corrected to equalize a signal, in a given color, relative to that acquired for the same incident intensity and color when acquired over non-phase-detect-autofocus-region pixels.

19. The image sensor of claim 17, wherein the image sensor includes regions of a Bayer pattern RGGB color filter array layout.

20. The image sensor of claim 17, wherein the image sensor includes regions of R, G, B, and IR color filters.

* * * * *